United States Patent

Loughridge

[11] 3,953,554
[45] Apr. 27, 1976

[54] DIFFUSER FOR AERATION SYSTEMS
[75] Inventor: Edward T. Loughridge, Mansfield, Ohio
[73] Assignee: Ashland Vault Incorporated, Ashland, Ohio
[22] Filed: July 11, 1973
[21] Appl. No.: 378,279

[52] U.S. Cl............................ 261/124; 261/122; 261/DIG. 5; 261/DIG. 70
[51] Int. Cl.................................... B01f 3/04
[58] Field of Search............ 261/124, 122, DIG. 5, 261/DIG. 47, DIG. 70

[56] References Cited
UNITED STATES PATENTS

| 2,305,796 | 12/1942 | Seidel | 261/122 |
| 2,639,131 | 5/1953 | Coombs | 261/DIG. 70 X |
| 2,659,582 | 11/1953 | Sandor | 261/122 |
| 3,163,684 | 12/1964 | Gilbert | 261/DIG. 70 X |
| 3,294,380 | 12/1966 | Born | 261/DIG. 70 X |
| 3,441,216 | 4/1969 | Good | 261/DIG. 70 |

FOREIGN PATENTS OR APPLICATIONS

| 1,029,754 | 5/1958 | Germany | 261/122 |

Primary Examiner—Frank W. Lutter
Assistant Examiner—William Cuchlinski, Jr.
Attorney, Agent, or Firm—McNenny, Farrington, Pearne & Gordon

[57] ABSTRACT

There is provided a simple gas diffusing apparatus composed of a top member having gas permeable perforations, a bottom member including a plurality of larger openings for removal of solid and semi-solid accretions, a gas inlet nipple for introduction of a gas, e.g. air, into the cavity formed by the assembly of the top and bottom members, a valve, a valve seat disposed on the inner surface of the bottom member, and stop means for the valve for confining the valve between a seated position and an unseated position.

7 Claims, 3 Drawing Figures

DIFFUSER FOR AERATION SYSTEMS

BACKGROUND OF THE INVENTION

The present invention relates as indicated to gas diffusers which are particularly useful in connection with the aeration treatment of sewage whereby air is introduced adjacent the bottom of a quantity of raw sewage material in the course of preparing the sewage for disposal. This mode of treatment of sewage is well known and widely practiced. There is need to provide a simple, inexpensive and effective diffuser structure; and, to this end, there has been provided a simple structure preferably formed of readily moldable plastic sections which are dimensioned and configured for mating coaction and which when assembled define a simple cavity and a ball valve assembly. The device in its preferred embodiments comprises, then, three pieces; namely, a top member having perforations therein for passage of gas therethrough, a bottom member including a gas inlet and having openings therein larger than the perforations to permit release of solid and semisolid accretions within the cavity which may enter through the perforations. The top and bottom members are desirably molded to include a valve seat and a valve stop so dimensioned and configured that when the top and bottom members are assembled and cemented together, a ball valve interposed therebetween is confined but permitted at the same time to move between a seated and an unseated position.

Fritted glass diffusers for introduction of gases into the bottom of a confined body of liquid are, of course, well known. Bubblers ranging from simple open U-tubes to sophisticated gas diffusion apparatus are known. A three-piece diffuser embodying the present invention is unknown at the present time.

BRIEF STATEMENT OF THE INVENTION

Briefly stated, the present invention is in a diffuser for submerged gas treatment of a liquid system, e.g. sludge or raw sewage, comprising in combination a top portion having a pattern of perforations therethrough and a bottom portion having a plurality of cut-out openings, each having a greater open area than any individual perforation. The top and bottom members define an internal cavity which in the preferred embodiments is dome-shaped. Gas inlet means are provided extending through the bottom portion and opening into the cavity. Normally seated valve means coact between the opening of the gas inlet means into the cavity and the cavity itself and are operable to an open or unseated position by gas under pressure in the inlet. Means are provided to confine the movement of the valve between a seated position and an unseated position.

In its more specific and preferred embodiments, the gas diffusers of the present invention are characterized by a top member having a pattern of perforations therein preferably adjacent the periphery thereof and a depending peripheral flange, and a bottom member having an upstanding peripheral flange dimensioned and configured for mating coaction with the flange of the top member to define an internal cavity, preferably dome-shaped. The bottom member is provided with a plurality of cut-out openings, each of which is larger than any individual perforation to permit removal or discharge of solid or semi-solid accretions which may occur within the cavity. A gas inlet nipple associated with the bottom member and located centrally thereof is provided with an integral ball valve seat at its internal opening into the cavity. Stop means for the ball valve are also provided which are integral with the top member and serve to confine the ball between a seated position and an unseated position when the top and bottom members are assembled. The ball valve member is desirably although not essentially formed of stainless steel.

BRIEF DESCRIPTION OF THE DRAWINGS

The present invention may be better understood by having reference to the annexed drawings wherein.

DETAILED DESCRIPTION OF THE DRAWINGS

Figure 1:
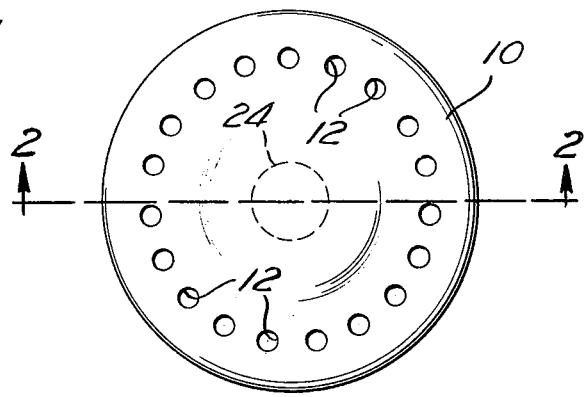
FIG. 1 is a top view of one embodiment of a gas diffuser in accordance with the present invention having a circular configuration and showing the peripheral perforations for distributing gas bubbles through a liquid body.

Referring now more particularly to the drawings showing a preferred embodiment of the present invention, the gas diffusers hereof are composed of a top member 10 conveniently albeit not essentially of circular configuration as shown in FIG. 1 and having a plurality of perforations 12 uniformly distributed adjacent the periphery of the top 10. The perforations are shown in a circular disposition, although any disposition thereof over the upper surface of the top 10 may be utilized if desired. Minimum fouling and contamination of the interior as well as convenience in manufacture are benefits of the illustrated arrangement. The top 10 is also provided with a peripheral depending flange 14, the interfacial surface 16 of which is provided with an annular recess 18 and a corresponding concentric rim 20 of lesser diameter than recess 18 for purposes as will be explained below. The top 10 is desirably convexly configured as best shown in FIG. 2 and also includes a stop member 22 for a ball valve 24 integrally molded therein.

Figure 2:
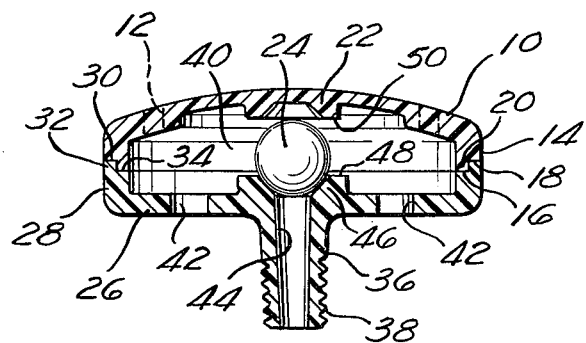
FIG. 2 is a cross-sectional view of the apparatus as shown in the plane indicated by the line 2—2 of FIG. 1.
Figure 3:
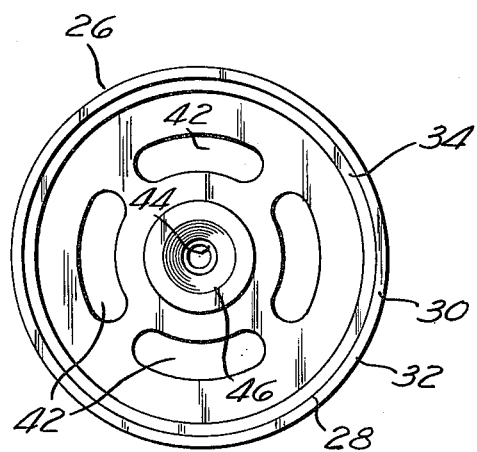
FIG. 3 is a top plan view of the bottom of the device shown in FIGS. 1 and 2.

As best shown in FIGS. 2 and 3, there is also provided a bottom member 26 desirably cast or molded from the same material of which the top 10 is formed, e.g. polypropylene. The bottom portion 26 is also of desirably circular configuration and is provided with a peripheral upstanding flange 28. The interfacial surface 30 of the upstanding flange 28 is provided with an outer rim 32 and an inner concentric 34 for mating coaction with the top 10. The respective locations of rims and recesses on the interfacial or mating surfaces 16 and 30 may be reversed, if desired.

In the final assembly of the top 10 with the bottom 26, a suitable cement or adhesive is disposed along the interfacial surfaces 16 and 30 of the top 10 and the bottom 26, respectively, and the parts cemented together. Any suitable means for holding the top and bottom members in assembled relation, e.g. adhesives, welding, heat sealing, bayonet locking means, mechanical fasteners, or the like, may be used. By far the simplest has been found to be the application of an adhesive to the interfacial surfaces 16 and 30.

Returning now to the description of the bottom member 26, there is integrally cast therewith a nipple 36 for admission of a gas, e.g. air, under pressure. The external surface of the nipple 36 may be threaded as at 38 to facilitate attachment to a gas or air supply line. Because of the possibility of accretion of solid or semi-solid matter within the cavity 40 defined by the top 10 and bottom 26 is assembled relation, there are provided openings 42 through the bottom. These are of generally larger size than the perforations 12 in the top 10 and aid in maintaining the cavity 40 free of foreign matter which may occur during periods of nonuse.

The opening 44 of the gas inlet nipple 36 to the interior of the cavity 40 is surrounded by an integrally cast valve seat 46. The seat 46 is geometrically configured for sealing coaction with the surface of the ball 24. The ball 24 readily seats itself through the action of gravity when gas flow through the inlet 36 is terminated, and lifts off the seat 46 when gas under pressure is introduced through the opening 44.

It will be observed that when the top 10 is assembled with the bottom 26, the stop member 22 is disposed relative to the valve seat 46 so that the ball 24 is able to move between a seated and an unseated position against the stop 22, but is unable to move laterally to an extent sufficient to permit escape of the ball so that it cannot become reseated upon seat 46 when gas flow is terminated. The distance between the innermost projection 48 of the valve seat 46 and the innermost projection 50 of the stop member 22 is less than the diameter of the ball 24 when the top 10 and the bottom 26 are in assembled condition.

In assembling the devices, the interfacial surface 30 of the upstanding flange 28 may be coated with a suitable adhesive, and the ball 24 disposed on the seat 46. Then the interfacial surface 16 of the depending flange 14 of the top 10 is also coated with an adhesive. Holding the bottom 26 with the ball 24 in the seat 46 in a relatively horizontal position, the top 10 and bottom 26 are positioned with the adhesive-coated interfacial surfaces 16 and 30 in confronting relation. The top 10 is thereby glued to the bottom 26 to assemble the diffuser device.

In use, these diffusers are conveniently threaded into a horizontal pipe located at the bottom of an aeration chamber. As low pressure but a high volume of air is supplied through the pipe fitting and the nipple 36, the flow of gas raises the stainless steel ball 24 from the seat 46 where it is forced against the upper stop member 22. When the ball 24 is in the raised position, the air passes around the ball into the cavity 40 and up through the holes 12 adjacent the periphery of the top 10. The forcing of the air through the holes and the resultant bubbling action through a confined body of liquid effects diffusion of the gas and aeration of the liquid.

When the air supply is cut off, the ball returns by gravity to the valve seat 46 whereupon a seal is formed preventing back-flow of the liquid into the gas supply line. Plugging of the gas supply line by accumulation of sludge, for example, is thereby prevented.

Since it is possible that sludge may enter the inside of the diffuser, e.g. cavity 40, through the gas diffuser holes 12 as when the air supply is cut off, the opening 42 in the bottom provide an escape for the sludge.

What is claimed is:

1. A diffuser for submerged gas treatment of a liquid system comprising a body assembly formed of a material which is non-porous and providing vertically spaced horizontally extending top and bottom wall portions cooperating at least in part to define an internal cavity, said bottom portion being formed with a centrally located inlet passage and an upwardly facing valve seat around said passage, said top wall portion being imperforate above said valve seat and providing a plurality of perforations in a pattern laterally around said valve seat, said bottom wall portion having a plurality of cut out openings laterally around said valve seat each having a greater open area than any individual perforation, and normally seated valve means positioned against said valve seat and closing said inlet passage, said valve means being movable under the influence of gas under pressure supplied through said inlet passage to an open unseated position, said body assembly providing means to confine the movement of said valve between said seated and unseated positions.

2. A diffuser in accordance with claim 1 wherein the cavity is dome-shaped at the top.

3. A diffuser for submerged aeration of a liquid comprising a top member formed of a non-porous material and providing a generally horizontally extending top wall portion having an imperforate central portion and a plurality of perforations therethrough generally symmetrically positioned around said central portion, said top member providing a depending perpheral flange, a bottom member providing a generally horizontal bottom wall space from said top wall and an upstanding peripheral flange dimensioned and configured for mating coaction with the depending peripheral flange of said top member to define an internal cavity, said bottom member providing a centrally located inlet gas nipple having an inlet passage therethrough and a valve seat within said cavity extending around said inlet passage beneath said central portion, said bottom member providing a plurality of cut out openings generally symmetrically positioned around said valve seat for removal of solid and semi-solid accretion within said cavity, a ball valve member positioned by gravity against said seat, and stop means on said top member for confining the movement of said ball between a seated position and a non-seated position.

4. A diffuser in accordance with claim 3 wherein the top member is cemented to the bottom member.

5. A diffuser in accordance with claim 3 wherein the ball valve member is a stainless steel ball.

6. A diffuser in accordance with claim 3 in which the peripheral flanges are provided with complimentary rims and recesses for mating coaction.

7. A diffuser in accordance with claim 3 in which the top is convexly shaped, said top and bottom members being formed of a molded plastic which is substantially immuned to deterioration within the liquid system.

* * * * *